United States Patent Office 3,140,163
Patented July 7, 1964

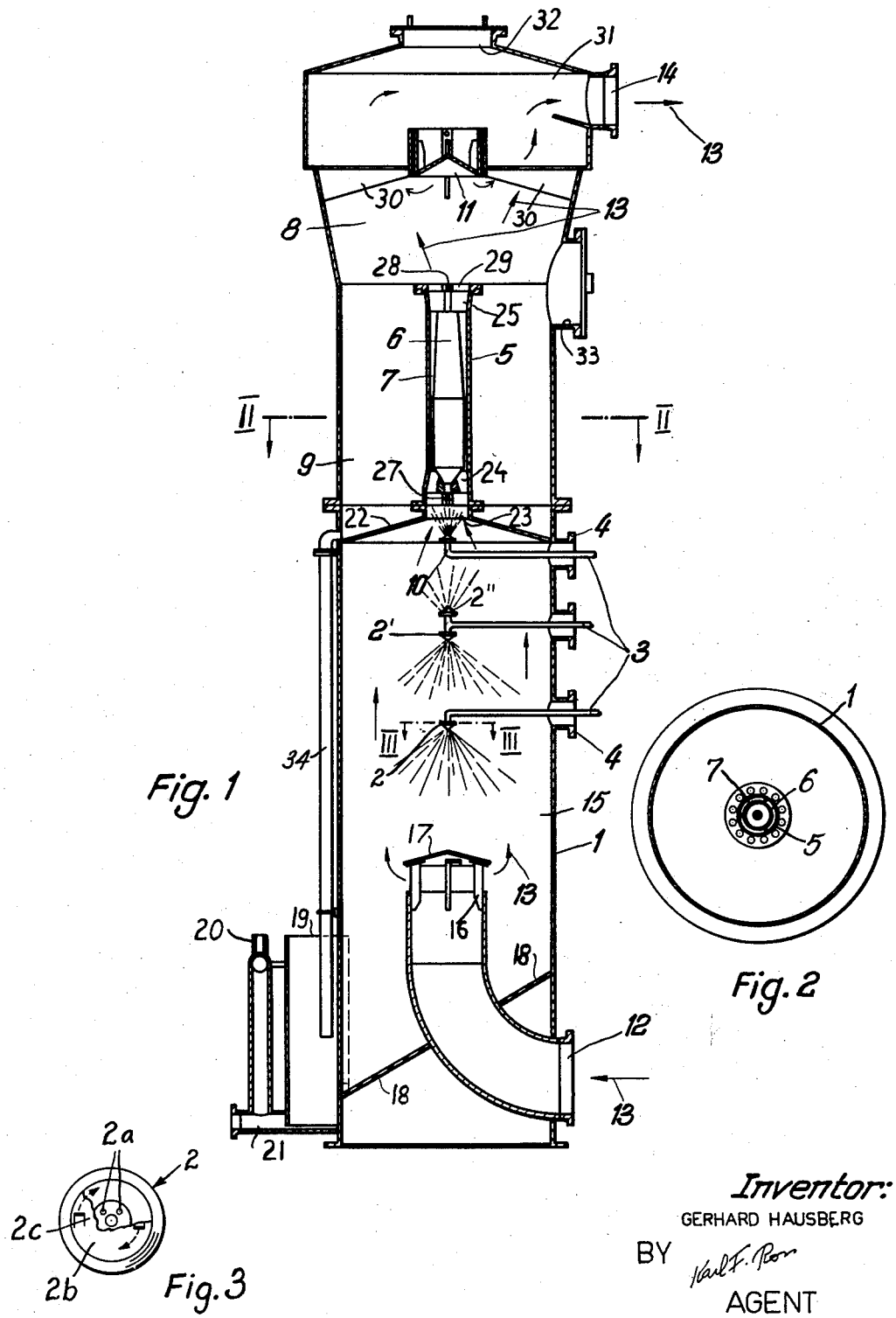

3,140,163
APPARATUS FOR CLEANING GASES
Gerhard Hausberg, Essen-Bredeney, Germany, assignor to Gottfried Bischoff, Bau kompl. Gasreinigungs-u. Wasserruckkuhlanlagen K.G., Essen, Germany, a corporation of Germany
Filed Mar. 17, 1961, Ser. No. 96,485
3 Claims. (Cl. 55—257)

My present invention relates to apparatus for cleaning gases and, more particularly, to a wash tower adapted to remove dust and like particles from the exhaust gases of industrial plants, metallurgical furnaces or the like.

The process of washing industrial, particle-laden gases free from entrained solid material by passing the gas in countercurrent to a wash liquid, usually water, through one or more wash towers has long been known. In general, the gas has been passed upwardly through the unobstructed chamber of a tower while water, introduced through suitable spray nozzles, percolated downwardly through the rising gas to wash the entrained particles therefrom. Such towers, however, while being relatively inexpensive and permitting a fairly swift flow of gas therethrough, have only a minimal cleaning efficiency so that the gas must often be passed through several of them before substantially all of the entrained particles are removed.

In order to improve the cleaning efficiency of gas-washing towers, it has been proposed to provide at least the upper portion of the tower with baffle plates, Raschig rings or the like in order to assure an intimate contact between the wash water and the gas. These baffles have been found to increase the resistance to gas flow, thereby lowering the velocity thereof, without a comparable increase in the cleaning efficiency of the apparatus.

It is an object of my invention to provide a tower for washing particle-laden gases with increased cleaning efficiency.

It is another object of the invention to provide an efficient washing tower for such gases which permits a relatively high velocity of gas flow therethrough and may be readily cleaned.

Still another object of the invention is to provide an improved wash tower for removing entrained particles from the exhaust gases of a blast furnace, steel converter, or other metallurgical furnace.

A wash tower according to the present invention comprises a generally cylindrical chamber having an unobstructed lower portion into which the particle-laden gas is fed and which is provided with one or more spray nozzles adapted to introduce a fine spray of a washing fluid, such as water, into the lower portion in counter-current to the flow of gas. The latter proceeds upwardly through a constricted intermediate portion of the chamber which is formed as a cylindrical throat and whose inner diameter is but a fraction of that of the lower portion. The upper portion of the chamber, above the aforementioned throat, widens again to preferably a diameter substantially equal to or greater than that of the lower portion. The gas admitted to the lower portion of the chamber becomes rapidly saturated with the wash water, which removes a substantial portion of the larger particles entrained by the gas, and then proceeds with a relatively high velocity through the constricted throat and into the enlarged upper portion of the chamber wherein its velocity suddenly decreases and part of the moisture carried up through the throat together with most of the residual particles are separated from the expanding gas. Advantageously, this upper portion of the chamber is provided with means for suppressing the turbulence of the gas emanating at high velocity from the constricted throat.

I have found that it is desirable to provide the constricted intermediate portion of the chamber with a central insert spaced from the wall of the throat and defining an annular space therewith. The annular space interconnects the enlarged upper and lower portions of the chamber. The insert may be streamlined (i.e., generally projectile-shaped and tapering upwardly) in order to reduce pressure and velocity losses as the gas passes through the annular space. A further portion of the dust particles entrained by the gas is thus released as the gas is compressed while passing through the annular space between the inner wall of the constriction and the insert. In order to insure a complete wetting of the gas, I prefer to provide a further nozzle adapted to direct a spray of the wash liquid against the insert at the mouth of the constriction. The insert may be axially adjustable relative to the mouth of the constriction, thereby affording control of the flow velocity of the gas through the annular space interconnecting the upper and lower portions of the chamber. The turbulence-suppressing upper portion of the latter may be formed with a baffle cap adapted to increase the washing efficiency still further.

The spray nozzles are preferably cylindrical atomizing spray heads, having tangential water inlets and central outlets, disposed one above the other along the axis of the chamber. The ratio of the diameter of the lower portion of the chamber to that of the throat may be as high as approximately 10 to 1, with the ratio of the cross-sectional area of the unobstructed lower portion to that of the annular space between the insert and the throat ranging upwardly of 100 to 1.

The above and other objects, features and advantages of my present invention will become more readily apparent from the following description, reference being made to the accompanying drawing in which:

FIG. 1 is an axial cross-sectional view through a gas-washing tower according to the inveniton;

FIG. 2 is a cross-sectional view taken along line II—II of FIG. 1; and

FIG. 3 is an enlarged cross-sectional view through a spray nozzle, taken on the line III—II of FIG. 1.

In the drawing I in the form of an upright tube show a washing tower 1 whose generally cylindrical interior comprises a substantially unobstructed lower chamber 15 into which a particle-laden gas is introduced via an inlet conduit 12. The outlet 16 of the latter is coaxial with the tower and is covered by a shield 17 which deflects descending water droplets and particles washed from the rising gas away from the outlet. The descending droplets and particles are collected upon the sloping bottom plate 18 of the chamber 15 and led thereby to a settling trough from which the liquid is decanted via a pipe 20 while the sludge separating from the liquid is conducted away via a pipe 21.

The wash water is sprayed into the chamber 15 from the atomizing heads or nozzles 2, 2' and 2" which are fed from the pipes 3 projecting into the chamber through the ports 4 in the wall thereof. The heads 2, 2' and 2" are disposed along the axis of cylinder 1. The heads 2 and 2' are directed downwardly to spray water in counter-current to the rising flow of air while nozzle 2" directs its spray upwardly, as does a further nozzle 10 located on a higher level, the water from each of the nozzles leaching the dust particles from the gas as it falls toward the plate 18. The interior of tube 1 is subdivided by an upwardly conical partition 22 into chamber 15 and an intermediate compartment formed by a cylindrical sleeve 5, whose cross-sectional area is only a fraction of that of the chamber 15, which extends axially within the cylinder and communicates with the chamber 15 via an inlet opening 23 at the apex of the partition 22.

An upwardly tapering streamlined insert 6 is axially suspended within the sleeve 5, between radial fins 24, 25, by a pair of mounting screws 27, 28 respectively engaging the hubs of the fins. The outlet opening 29 of the sleeve 5 discharges gases passing through the annular passage 7 between sleeve and insert into the enlarged frustoconical upper chamber 8. The top of chamber 8 is shown to be of larger cross-sectional area than the cylindrical chamber 15 and to be formed with turbulence-suppressor plates 30 between which the gas passes to the head 31 of the tower 1 and then out therefrom via the exit port 14. The tower 1 is provided with cleaning openings 32, 33 which are shown to be closed by suitable covers.

A baffle cap 11 of conical shape is disposed axially within the upper chamber 8 on the plates 30 directly above the outlet opening 29 of the sleeve 5 so that at least part of the high-velocity gases emanating from this opening will impinge on the baffle cap 11 and be deflected generally downwardly, thereby releasing additional quantities of entrained particles and increasing the efficiency of the tower. The plates 30 will thus be seen to lie in an annular clearance between cap 11 and the wall of tube 1, this clearance together with port 14 forming an outlet for the gases.

The annular compartment 9 formed between the sleeve 5 and the wall of tube 1 collects the particles and water droplets released by the gas issuing from the sleeve 5. These particles and droplets are led by a pipe 34 to the trough 19.

Each of the nozzles in chamber 15 is preferably of the construction shown in FIG. 3 for the nozzle 2, including a shell with a cylindrical inlet end and a frustoconical outlet end, the latter being provided with discharge apertures 2a and separated from the former by a transverse partition 2b. This partition is formed with sloping passages 2c to convert the axial flow of the incoming fluid into a swirling motion entering the outlet end of the shell in a generally tangential direction.

In operation, gas is fed through the conduit 12 into the chamber 15 in the direction shown generally by the arrows 13 and rises in counter-current to the descending water droplets sprayed into the chamber by the heads 2, 2' and 2" whereby the largest particles are washed from the gas and accumulated in trough 19. The gas, still entraining therewith some smaller particles, then passes at a much greater velocity through the restricted annular space 7 after being wetted still further by the upwardly directed jets of wash liquid from nozzle 10 positioned adjacent the mouth 23 of the sleeve 5. The wet gas discharged from the sleeve 5 at its outlet 29 expands into the enlarged upper chamber 8 of the cylinder, thereby sedimentarily depositing most of the remaining particles. The high-velocity gas stream impinges upon the baffle cap 11 and further discharges entrained particles before it passes out through the exit port 14. The water entrained upwardly through the sleeve 5 by the gas stream serves to flush the sediment from the compartment 9 while the sprays from nozzles 2, 2' and 2" likewise flush the deposited particles from the lower chamber 15.

In a practical realization of the embodiment shown in the drawing, the diameter of the chamber 15 was about 1250 mm. while that of the sleeve was approximately 255 mm., the remaining elements having been proportioned substantially as shown in FIGS. 1 and 2.

I claim:

1. A wash tower for cleaning industrial exhaust gases, comprising a generally cylindrical upright tube; partition means internally subdividing said tube into a lower and an upper chamber of relatively large cross-sectional area; a vertical sleeve of relatively small cross-sectional area interconnecting said chambers; an upwardly tapering streamlined insert in said sleeve defining therewith a restricted annular passage; inlet means in said lower chamber for discharging a rising stream of particle-laden gas at a location substantially in line with said sleeve; nozzle means in said lower chamber between said inlet and the lower end of said sleeve, said nozzle means including a downwardly directed lower spray head and an upwardly directed upper spray head, the latter being disposed immediately below said lower end of said sleeve for introducing jets of wash liquid upwardly into said passage; baffle means in said upper chamber above the top end of said sleeve for intercepting an upward flow of moisture-laden gas from said passage and causing precipitation of entrained moisture upon expansion of said gas in said upper chamber; drain means for precipitated moisture at said partition means; and outlet means for said gas communicating with said upper chamber substantially at the level of said baffle means.

2. A wash tower as defined in claim 1 wherein said baffle means comprises a substantially conical cap disposed coaxially with said sleeve, said outlet means including an annular clearance formed between said cap and the wall of said tube.

3. A wash tower as defined in claim 2, further comprising turbulence-suppressor plates extending from said cap to said wall within said clearance.

References Cited in the file of this patent

UNITED STATES PATENTS

| 1,268,100 | Dreffein | June 4, 1918 |
| 1,620,826 | Mitchell | Mar. 15, 1927 |
| 1,777,277 | Lednum | Sept. 30, 1930 |
| 1,799,084 | Brdar | Mar. 31, 1931 |
| 2,093,895 | Majonnier et al. | Sept. 21, 1937 |
| 2,103,542 | Mart | Dec. 28, 1937 |
| 2,811,222 | Leech | Oct. 29, 1957 |
| 2,871,973 | Roujob | Feb. 3, 1959 |
| 2,889,005 | Vmbricht | June 2, 1959 |

FOREIGN PATENTS

| 81,393 | Denmark | Oct. 29, 1956 |
| 462,018 | France | Jan. 17, 1914 |
| 773,323 | Great Britain | Apr. 24, 1957 |
| 1,225,344 | France | Feb. 15, 1960 |